United States Patent

Chikuma

Patent Number: 5,189,722
Date of Patent: Feb. 23, 1993

[54] FIBER TYPE WAVELENGTH CONVERSION ELEMENT

[75] Inventor: Kiyofumi Chikuma, Saitama, Japan

[73] Assignee: Pioneer Electronic Corporation, Tokyo, Japan

[21] Appl. No.: 873,693

[22] Filed: Apr. 21, 1992

Related U.S. Application Data

[63] Continuation of Ser. No. 575,477, Aug. 31, 1990, abandoned.

Foreign Application Priority Data

Sep. 4, 1989 [JP] Japan ............... 1-228632
May 28, 1990 [JP] Japan ............... 2-137632

[51] Int. Cl.$^5$ ............... G02B 1/04; G02B 6/10
[52] U.S. Cl. ............... 385/122
[58] Field of Search ............... 307/425–430; 350/96.12, 96.15, 96.29, 96.30, 96.34; 385/122, 123, 129; 359/326–332

[56] References Cited

U.S. PATENT DOCUMENTS

| | | | |
|---|---|---|---|
| 4,077,699 | 3/1978 | Dyott et al. | 350/96.34 |
| 4,830,447 | 5/1989 | Kamiyama et al. | 350/96.12 |
| 4,838,638 | 6/1989 | Kamiyama et al. | 350/96.34 X |
| 4,893,888 | 1/1990 | Okazaki et al. | 350/96.12 |
| 4,909,595 | 3/1990 | Okazaki et al. | 350/96.29 |
| 4,909,598 | 3/1990 | Ninomiya et al. | 350/96.34 |
| 4,923,277 | 5/1990 | Okazaki et al. | 350/96.29 |
| 4,952,013 | 8/1990 | Harada et al. | 350/96.20 |

FOREIGN PATENT DOCUMENTS 0323884 7/1989 European Pat. Off.
0329429 8/1989 European Pat. Off.

Primary Examiner—Akm E. Ullah
Attorney, Agent, or Firm—Foley & Lardner

[57] ABSTRACT

In a fiber type wavelength conversion element, which has a fiber core made of non-linear optical crystal and in which a wavelength of incident ight is converted by non-linear optical effects of the second order on the core, a clad material is used, which has a refractive index to satisfy a condition of:

$$0.95 < n\, clad^{2\omega}/n\, core^{\omega} < 1.005$$

where the refractive index of the core to incident light is $n_{core}\omega$, and the refractive index of the clad to secondary higher harmonic light as $n_{clad}{}^{2\omega}$.

10 Claims, 1 Drawing Sheet

SH WAVE RING

FIBER TYPE WAVELENGTH CONVERSION ELEMENT

This application is a continuation of application Ser. No. 07/575,477, filed Aug. 31, 1990, now abandoned.

BACKGROUND OF THE INVENTION

1. Field of the Invention

The present invention relates to a fiber type wavelength conversion element, and in particular to a fiber type wavelength conversion element using Cherenkov radiation type phase matching.

2. Description of Background Information

A wavelength conversion element is already known, in which an optical waveguide is provided using non-linear medium, a light wave is guided into extremely small regions, and the second higher harmonics of light are efficiently generated. This wavelength conversion element is roughly divided into the following two types according to the method to satisfy the phase matching: One is a type in which the phase velocity of a non-linear polarization wave excited from incident light is equalized with that of the second higher harmonics and phase matching is performed between the fundamental wave, i.e. waveguide mode of incident light, and a waveguide mode of the second higher harmonics. The other is a type in which so-called Cherenkov radiation type phase matching is performed between a waveguide mode of a fundamental wave and a radiation mode of the second higher harmonics.

SUMMARY OF THE INVENTION

An object of the present invention is to provide a fiber type wavelength conversion element with high efficiency, using Cherenkov radiation type phase matching.

The fiber type wavelength conversion element according to the present invention comprises a core of fiber made of non-linear optical crystal and it is a fiber type wavelength conversion element to convert the wavelength of incident light by the secondary non-linear optical effect in the core. When it is supposed that the refractive index of the core to incident light is $n_{core}^{2\omega}$ and the refractive index of the clad to the secondary higher harmonic light is $n_{clad}^{2\omega}$. The invention is made of the clad material having the refractive index to satisfy the following condition:

$$0.95 < N_{clad}^{2\omega}/N_{core}^{\omega} < 1.005$$

DETAILED DESCRIPTION OF THE PREFERRED EMBODIMENT

In the following, description is given in detail on the embodiment of the invention in connection with the drawings.

First, description is given on the generation of the secondary higher harmonics (SH wave) in a fiber type wavelength conversion element using Cherenkov radiation type phase matching.

Figure 1:
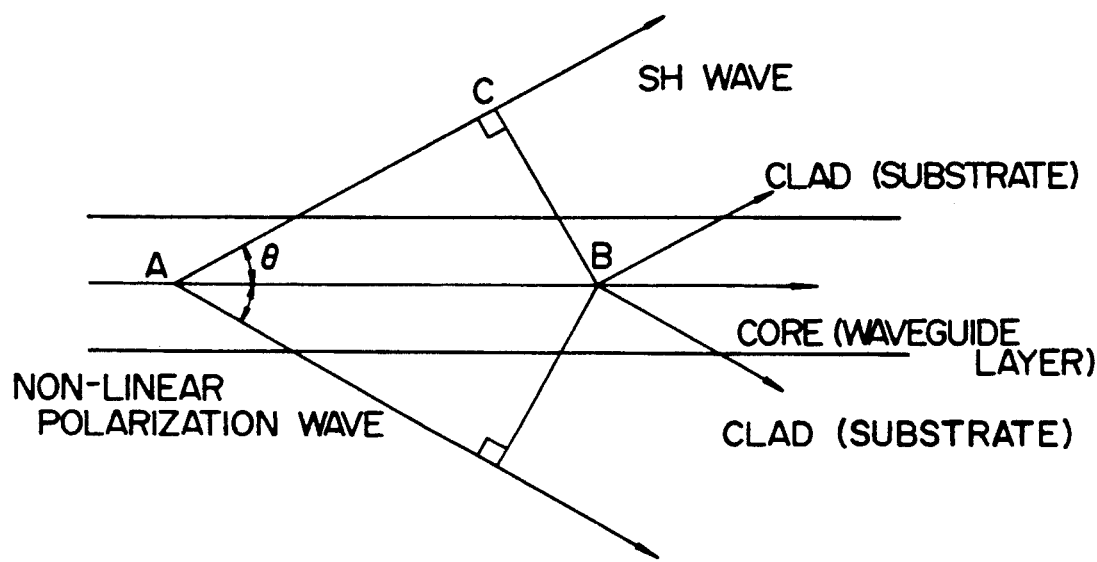
FIG. 1 schematically shows the concept of the generation of a SH wave in a fiber type wavelength conversion element.
Figure 2:
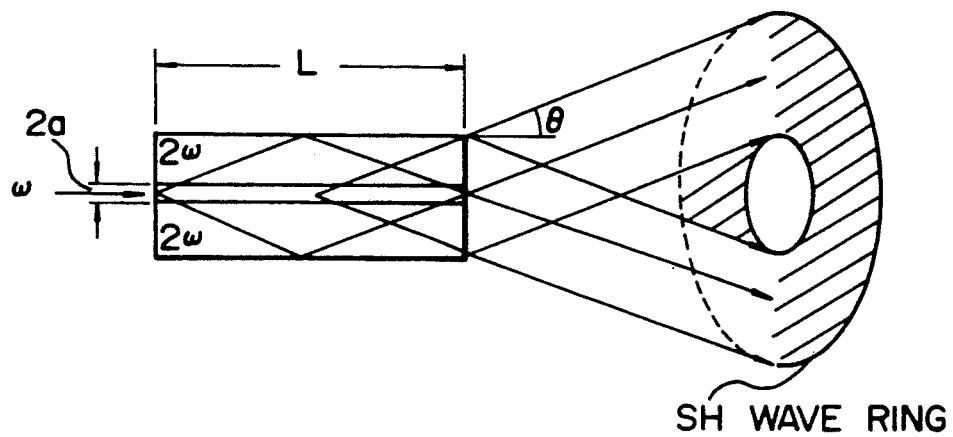
FIG. 2 is a drawing to show the emission of a SH wave from type wavelength conversion element.

In FIG. 1, when a fundamental wave mode is propagated in the core with an effective refractive index $N^\omega$, a nonlinear polarization wave to generate a SH wave is also propagated with the same phase velocity $C/N^\omega$ (C: Light velocity). It is supposed that the SH wave is generated in the direction where the non-linear polarization wave takes an angle of $\theta$ with the direction of the waveguide at the point A in the figure, and that, after unit time, an SH wave is again generated in the direction with an angle of $\theta$ at point B. If the SH wave generated at the point A reaches the point C after unit time propagating in the clad and if $\theta$ is the angle, at which AC intersects BC perpendicularly, the wave surface of the SH wave with a nonlinear polarization wave is generated between A and B. As the result, a coherent SH wave is generated.

If the refractive index of the clad to SH wavelength is $n_{clad}^{2\omega}$, the condition for phase matching is:

$$N\omega = n_{clad}^{2\omega} \cos \theta \quad (1)$$

from the figure. Namely, $$N\omega < n_{clad}^{2\omega} \quad (2)$$

A SH wave is automatically generated in the direction of $\theta$ where phase matching is performed. In general, if it is supposed that the refractive indices of the clad and the core to the fundamental wave are $n_{clad}^\omega$ and $n_{core}^\omega$ respectively and that the overlayer is the air, the condition for the propagation of the fundamental wave in the core is:

$$n_{clad}^\omega < N^\omega < n_{core}^\omega \quad (3)$$

In the wavelength dispersion of the refractive index of the clad, $n_{clad}^\omega < n_{clad}^{2\omega}$. Therefore, if the condition $$n_{clad}^\omega < n_{core}^\omega n_{clad}^{2\omega} \quad (4)$$

is satisfied, the equation (2) is satisfied for all fundamental modes with the core having any diameter. Even when $$n_{clad}^\omega < n_{clad}^{2\omega} < n_{core}^\omega$$

there exists a fundamental wave, which satisfies the equation (2) with a film thickness within a certain range.

In this way, in the fiber type wavelength conversion element, which is crystallized on a fiber core using non-linear optical material, when the light from laser light source to emit coherent light such as semiconductor laser or YAG laser is guided to a fiber in an $LP_{01}$ mode, and an SH wave is generated by non-linear polarization excited by such light, an SH wave is propagated as the clad mode to repeat total reflection within the boundary between the clad and the air and it is emitted in a conical shape in the direction, making an angle of $\theta$ with the end surface of the fiber.

In the meantime, it is necessary to perform analysis by introducing an approximate equation in order to identify the aspect of the generation of the SH wave by Cherenkov type radiation phase matching. Accordingly, the approximate equation to describe the generation of the SH wave and its solution are given, and discussion is made on the output of the SH wave.

If it is supposed that an electric field of incident light wave is $E$, dielectric constant under vacuum condition is $\epsilon_0$, and magnetic permeability under a vacuum condition is $\mu_0$, SH wave $E_0^{2\omega}$ can be approximated from the following equation.

$$E_0^{2\omega}(r) = \int \frac{e^{-ik|r-r'|}}{4\pi|r-r'|} f(r')d$$

This is the solution of the following inhomogeneous Helmholtz equation.

$$\nabla^2 E_0^{2\omega} + \mu_0(2\omega)^2 \epsilon_0 E_0^{2\omega} = f$$

where $f = -4\omega^2\mu_0\epsilon_0 d^{(2)} E^\omega E^\omega$, and $d^{(2)}$ is a constant to express non-linear effects of the second order. As a result, $E_0^{2\omega}$ can be interpreted as the solution to describe the physical system when it is supposed that the dielectric constant in the waveguide or core is equal to that of the substrate or clad and is at a constant level for the entire space, and that non-linear polarization excited from the primary light is the light source.

Utilizing the fact that $r$ is sufficiently far compared with $r'$, the following equation is obtained.

$$E^{2\omega}(r) = \frac{e^{-ik|r|}}{4\pi|r|} \int e^{-ik|r-r'|} f(r')d$$

3-dimensional vector $r$ is expressed by 2-dimensional vectors $P$ and z. Namely, it is supposed that $r=(P, z)$. If the electric field where light is guided toward the direction of the z axis is expressed by:

$$E^\omega(r) = e^\omega(p)e^{-l\beta x}$$

non-linear polarization within the range of $-L/2 < z < L/2$ where a non-linear medium is present is performed.

$$f = -4\omega^2\mu_0\epsilon_0 d^{(2)} e^\omega e^\omega(p) e^{-l2\beta x}$$

Although the electric field of the SH wave can be expressed by the following equation, the range of integration relating to $-L/2 < z < L/2$, and it is the entire space if $P$ is concerned.

$$E^{2\omega}(r) = -\frac{\omega^2 \mu_0 \epsilon_0 e^{-ik|r|}}{\pi|r|} \cdot \int e^{ik|r-r'|} d^{(2)} e^\omega e^\omega(p') e^{-l2\beta z} dp' dz$$

Here, it is supposed that the wavelength of the fundamental wave under a vacuum condition is $\lambda$, and that $\kappa$ is as follows:

$$\kappa = k/2 = 2\pi n_{clad}^{2\omega}/\lambda$$

$r = (|r|\sin\theta\cos\phi\theta, |r|\sin\theta\sin\phi, |r|\cos\theta)$

When integration is performed on z, $$E^{2\omega}( ) = \frac{\omega^2 \mu_0 e^{-ik|r|}}{\pi|r|} \cdot \frac{\sin[(\kappa\cos\theta - \beta)L]}{(\kappa\cos\theta - \beta)}$$

-continued $$\int \exp\left[-ik\frac{P}{|r|} \cdot p'\right] d^{(2)} e^\omega e^\omega(p')dp'$$

Thus, it is evident that the electric field $E^{2\omega}$ is strongly radiated toward the direction, which is determined by $\cos\theta = \beta/\kappa$. This expresses well the features of Cherenkov radiation and the approximate equation and its solution describe this well.

Next, the output of the SH wave is discussed.

When it is supposed that the power of the SH wave is $P^{2\omega}$, then, $$P^{2\omega} = \frac{k}{4\omega\mu_0} \int_{|r|=R} (E^{2\omega} \cdot E^{2\omega*}) =$$

$$\frac{\epsilon_0^{\frac{1}{2}}}{2\mu_0^{\frac{1}{2}}} \int_{|r|=R} (E^{2\omega} \cdot E^{2\omega*})d$$

To obtain the power, $E^{2\omega} \cdot E^{2\omega*}$ is calculated. When $r$ is expressed by polar coordinates as:

$r = (|r|\sin\theta\cos\phi, |r|\sin\theta\sin\phi, |r|\cos\theta)$ and it is supposed that $r = (p, Z)$, $r' = (p', Z')$ when integrated on z, $$E^{2\omega} \cdot E^{2\omega*}(r) = \frac{\omega^4 \mu_0^2 \epsilon_0^2}{\pi^2 |r|^2} \frac{\sin^2[(\kappa\cos\theta - \beta)L]}{(\kappa\sin\theta - \beta)^2} \times$$

$$\int \exp[ik|p - p'|\sin\theta\cos(\phi - \phi_0)]\{d^{(2)} e^\omega e^\omega(p)\} \cdot \{d^{(2)} e^\omega e^\omega(p')\} dp dp'$$

To simplify the equation, the following substitution is performed.

$$d_{eff}^2 g(p) \cdot (p') = \{d^{(2)} e^\omega e^\omega(p)\} \cdot \{d^{(2)} e^\omega e^\omega(p')\}$$

From these and from the equation (a) below, $$P^{2\omega} = \frac{n_{clad}^{2\omega} \epsilon_0 \omega^4 d_{eff}^2}{2\pi^2 c^3} \cdot \int \frac{\sin^2[(\kappa\cos\theta - \beta)L]}{(\kappa\cos\theta - \beta)^2} \cdot$$

$$\exp[ik|p - p'|\sin\theta\cos(\phi - \phi_0)] \quad (p) \cdot (p') dp dp' d\phi \sin\theta d\theta$$

Integrating on $\phi$, the addition theorem of Bessel functions is used. At the same time, $P$ and $P'$ are expressed by polar ordinates as:

$p = (r\cos\phi, r\sin\phi), p' = (r\cos\phi', r\sin\phi')$

Then, $$P^{2\omega} = \frac{n_{clad}^{2\omega} \epsilon_0 \omega^4 d_{eff}^2}{\pi c^3} \int \frac{\sin^2[\kappa\cos\theta\beta)L]}{(\kappa\cos\theta - \beta)^2} \sum_{m=0}^{\infty} \delta_m J_m(2\kappa r\sin\theta) J_m(2\kappa r'\sin\theta)\cos(m\phi - m\phi') \times \quad (a)$$

$$(r, \phi) \cdot (r', \phi') r r' dr dr' d\phi d\phi' \sin\theta d\theta$$

$\epsilon_m$ is Neumann's factor, and it is 1 when m=0 and it is 2 otherwise.

In the case of an axially symmetric system where a nonlinear crystal is used as the fiber core and wavelength conversion is performed, $g(r, \phi)$ does not depend on $\phi$ and only the term m=0 remains in the equation (a). Therefore, $$P^{2\omega} = \frac{4\pi n_{clad}^{2\omega} \epsilon_0 \omega^4 d_{eff}^2}{c^3} \cdot \int \frac{\sin^2[(\kappa\cos\theta - \beta)L]}{(\kappa\cos\theta - \beta)^2}$$

$$|\int J_0(2\kappa r \sin\theta) \ (r) r dr|^2 \sin\theta d\theta$$

where $\omega$ represents the angular frequency of incident light, c is light velocity under vacuum conditions, $\beta$ is a propagation constant of guided light, L is the length of a wavelength conversion element contributing to wavelength conversion, $J_0$ is class 1 Bessel function of 0 order. Also, a is the core radius of the fiber, and $d_{eff}$ is a nonlinear constant effectively contributing to wavelength conversion. g (r) can be easily calculated as $LP_{01}$ mode is guided:

$$(r) = -\omega^2 \mu_0^2 C^2 \frac{K_1(W)^2 a^2}{J_1(U)^2 U^2} \cdot J_0\left(\frac{Ur}{a}\right)^2$$

where $$U = \omega^2 \mu_0 \epsilon_1 - \beta^2)^{\frac{1}{2}} a$$

$$W = (\beta^2 - \omega^2 \mu_0 \epsilon_2)^{\frac{1}{2}} a$$

$\mu_0$ is magnetic permeability under vacuum conditions, $J_1$ is a class 1 Bessel function of the first order, and $K_1$ is a class 1 modified Bessel function. $\epsilon_1$ and $\epsilon_2$ are dielectric constants to incident light ($\omega$) for the core and clad respectively:

$$\epsilon_1 = \epsilon_0 (n_{core}^\omega)^2 \epsilon_2 = \epsilon_0 (n_{clad}^\omega)^2$$

C is a constant, which can be obtained for the total energy of light guided by the fiber. The power $P^\omega$ of the primary light is divided into the power $P_{core}^\omega$ of the light in the core and the power $P_{clad}^\omega$ of the light in the clad as follows:

$$P^\omega = P_{core}^\omega + P_{clad}^\omega$$

$$P_{core}^\omega = \frac{\pi \omega \mu_0}{2\beta} (\omega^2 \mu_0 \epsilon_1 + \beta^2) C^2 \cdot \frac{K_1(W)^2 a^4}{J_1(U)^2 U^2} (J_0(U)^2 + J_1(U)^2)$$

$$P_{clad}^\omega = \frac{\pi \omega \mu_0}{2\beta} (\omega^2 \mu_0 \epsilon_2 + \beta^2) C^2 \cdot \frac{a^4}{W^2} (K_1(W)^2 - K_0(W)^2)$$

C can be obtained from the above equations using the power $P^\omega$ of the guided light. In case non-linear material of the core is determined in the fiber type wavelength conversion element, the core radius a of the fiber and refractive index of clad material are changed as parameters, and a fiber type wavelength conversion element with high efficiency can be obtained by estimating the output of a wavelength conversion element from the above equation through numerical calculation.

In tis case, the material having the refractive index satisfying the condition of:

$$0.98 < n_{clad}^{2\omega}/n_{core}^\omega < 1.005$$

is selected as clad material.

For example, in case DAN (4-(N, N-dimethylamino)-3-acetoamidenitrobenzene) ($n_{core}^\omega = 1.738$) is used as nonlinear material of the core, and LAF03 glass ($n_{clad}^\omega = 1.7176$, $n_{clad}^{2\omega} = 1.7398$) is used as the clad material, $$n_{clad}^\omega/n_{core}^\omega = 0.988$$

$$n_{clad}^{2\omega}/n_{core}^\omega = 1.001$$

and the above conditions could be satisfied. The conversion efficiency [%] in this case is $0.23 \times 10^{-2}$ if the core radius [μm] is 0.5, $0.24 \times 10^{-1}$ if it is 0.7, 0.16 if it is 0.9, 0.17 if it is 1.1, 0.15 if it is 1.3, and 0.13 if it is 1.5.

In case DAN is used as non-linear material for the core, and SF1 glass ($n_{clad} = 1.6925$, $n_{clad}^{2\omega} = 1.7254$) is used as the clad material, $n_{clad}^\omega/n_{core}^\omega = 0.973$
$n_{clad}^{2\omega}/n_{core}^\omega = 0.993$ and the above conditions could be satisfied. The conversion efficiency in this case is 0.16 if the core radius [μm] is 0.5, 0.34 if it is 0.7, and 0.83 if it is 0.9.

Also, in case MNA(2-methyl-4-nitroaniline) ($n_{core}^\omega = 1.785$) is used as non-linear material of the core, and SF14 glass ($n_{clad}^\omega = 1.7331$, $n_{clad}^{2\omega} = 1.7713$) is used as the clad material, $$n_{clad}^\omega/n_{core}^\omega = 0.971$$

$$n_{clad}^{2\omega}/n_{core}^\omega = 0.9923$$

and the above conditions could be satisfied. The conversion efficiency [%] in this case is 7.67 if the core radius, [μm] is 0.5, 18.9 if it is 0.7, and 30.4 if it is 0.9, showing high efficiency. In any case, these are the results when the power of incident light $P^\omega = 40$[mW] and the wavelength of incident light $\lambda = 1064$ [nm].

Further, the material having the refractive index satisfying the condition of $0.95 < n_{clad}^{2\omega}/n_{core}^\omega < 1.005$ is selected as the clad material.

For example, in the case where DMNP (3,5-dimethyl-1-(4-nitrophenyl) pyrazole) ($n_{core}^\omega = 1.786$) is used as non-linear material of the core, and in the case where the light from a semiconductor laser of 870 nm is used as the fundamental wave and wavelength is converted, the conversion efficiency, the refractive index ratio r of $\eta$[%] (=$n_{clad}^\omega/n_{core}^\omega$), and the dependency on core radius of the glass of Table 1 below were examined. This was the case where the power of the guided primary light is 40 nW and fiber length is 1 mm, and the value of $\eta \times 100$ was entered in Table 1.

TABLE 1

| | Glass material of clad | Ratio (r) | Core radius [μm] | | | | | | | | | | | |
|---|---|---|---|---|---|---|---|---|---|---|---|---|---|---|
| | | | 0.30 | 0.35 | 0.40 | 0.45 | 0.50 | 0.60 | 0.70 | 0.80 | 1.00 | 1.20 | 1.40 | 1.60 |
| 1 | LaSF01 | 1.012 | 0.00 | 0.00 | 0.00 | 0.03 | 0.10 | 0.16 | 0.00 | 0.32 | 0.81 | 0.21 | 0.04 | — |
| 2 | SF11 | 1.022 | 0.01 | 0.66 | 0.40 | 0.91 | 1.11 | 0.40 | 0.00 | 0.45 | 0.85 | — | — | — |
| 3 | SF14 | 1.007 | 0.82 | 2.69 | 4.31 | 4.59 | 3.61 | 0.82 | 0.00 | 0.20 | — | — | — | — |
| 4 | SF4 | 1.003 | 1.46 | 3.77 | 5.38 | 5.49 | 4.26 | 0.93 | 0.04 | — | — | — | — | — |
| 5 | LaF05 | 1.000 | 0.24 | 1.20 | 2.57 | 3.47 | 3.37 | 0.89 | 0.00 | 0.20 | — | — | — | — |
| 6 | SF13 | 0.994 | 3.51 | 6.28 | 7.71 | 7.53 | 5.75 | 1.11 | — | — | — | — | — | — |
| 7 | SF3 | 0.993 | 3.54 | 6.30 | 7.76 | 7.65 | 5.58 | 1.11 | — | — | — | — | — | — |
| 8 | SF10 | 0.986 | 5.24 | 7.99 | 9.47 | 8.89 | 7.50 | 11.2 | — | — | — | — | — | — |
| 9 | LaFO3 | 0.981 | 2.34 | 4.54 | 6.40 | 8.14 | 9.23 | 8.82 | — | — | — | — | — | — |

Conversion efficiency [×10$^{-2}$%]

TABLE 1-continued

| Glass material of clad | Ratio (r) | Core radius [μm] | | | | | | | | | | | |
|---|---|---|---|---|---|---|---|---|---|---|---|---|---|
| | | 0.30 | 0.35 | 0.40 | 0.45 | 0.50 | 0.60 | 0.70 | 0.80 | 1.00 | 1.20 | 1.40 | 1.60 |
| 10 SF1 | 0.979 | 6.43 | 9.08 | 10.9 | 12.2 | 10.0 | 0.77 | — | — | — | — | — | — |
| 11 LaF08 | 0.975 | 4.51 | 6.92 | 9.70 | 12.4 | 16.0 | — | — | — | — | — | — | — |
| 12 LaFO2 | 0.974 | 4.36 | 6.72 | 8.86 | 12.4 | 17.9 | — | — | — | — | — | — | — |
| 13 LaF07 | 0.974 | 5.10 | 7.35 | 9.69 | 15.8 | — | — | — | — | — | — | — | — |
| 14 SF15 | 0.968 | 8.03 | 10.5 | 13.8 | 23.5 | 10.0 | — | — | — | — | — | — | — |
| 15 LaF01 | 0.962 | 5.50 | 6.93 | 4.61 | — | — | — | — | — | — | — | — | — |
| 16 SF8 | 0.961 | 8.39 | 10.6 | 14.6 | — | — | — | — | — | — | — | — | — |
| 17 SF5 | 0.951 | 8.32 | 8.11 | — | — | — | — | — | — | — | — | — | — |
| 18 SF2 | 0.936 | 6.12 | — | — | — | — | — | — | — | — | — | — | — |

Although not given in Table 1, when optical glass SF15 ($n_{clad}^{2\omega} = 1.729$) is used as clad under the same conditions as above, the conversion efficiency was 0.351 % with a core radius of 0.475 μm.

Also, if optical glass LAF07 ($n_{clad}^{2\omega} = 1.734$) is used as clad, the conversion efficiency was 0.117% when core radius was 0.425 μm, and it was 0.298% when core radius was 0.475 μm.

Further, when DAN was used as core material and the light from a YAG laser with wavelength of 1064 nm was converted, the glass material as given in Table 2 below was examined. This was the case where the power of the guided primary light was 40 mW and fiber length was 1 mm. The value of $\eta \times 100$ when conversion efficiency was $\eta$ was entered in Table 2.

TABLE 2

| Glass material of clad | Ratio (r) | Core radius [μm] | | | | | | | | | | | | |
|---|---|---|---|---|---|---|---|---|---|---|---|---|---|---|
| | | 0.30 | 0.35 | 0.40 | 0.45 | 0.50 | 0.60 | 0.70 | 0.80 | 1.00 | 1.20 | 1.40 | 1.60 | |
| 19 SF14 | 1.019 | 0.00 | 0.00 | 0.00 | 0.00 | 0.00 | 0.00 | 0.00 | 0.00 | 0.00 | 0.04 | 0.04 | 0.12 | Conversion |
| 20 SF4 | 1.015 | 0.00 | 0.00 | 0.00 | 0.00 | 0.00 | 0.00 | 0.02 | 0.11 | 0.33 | 0.65 | 1.16 | 1.27 | efficiency |
| 21 SF3 | 1.006 | 0.00 | 0.00 | .002 | 0.03 | 0.16 | 1.21 | 3.60 | 6.87 | 10.2 | 12.8 | 12.9 | 8.2 | [×10$^{-2}$%] |
| 22 SF13 | 1.004 | 0.00 | 0.00 | .002 | 0.02 | 0.14 | 1.13 | 3.42 | 6.60 | 9.88 | 12.3 | 12.4 | 7.83 | |
| 23 LaF05 | 1.001 | 0.00 | 0.00 | 0.00 | .004 | 0.04 | 0.53 | 2.07 | 4.55 | 7.33 | 9.68 | 10.7 | 7.55 | |
| 24 SF13 | 0.999 | 0.00 | .009 | 0.11 | 0.52 | 1.40 | 4.31 | 7.85 | 11.5 | 15.4 | 19.8 | — | — | |
| 25 LaF08 | 0.993 | 0.00 | 0.01 | 0.15 | 0.63 | 1.53 | 4.07 | 6.71 | 9.14 | 11.4 | 13.9 | — | — | |
| 26 SF1 | 0.992 | 0.00 | 0.09 | 0.53 | 1.44 | 2.68 | 5.28 | 7.53 | 9.50 | 11.4 | 13.4 | — | — | |
| 27 SF15 | 0.982 | 0.10 | 0.60 | 0.51 | 2.48 | 3.31 | 4.29 | 4.42 | 2.96 | — | — | — | — | |
| 28 LaF01 | 0.981 | 0.03 | 0.30 | 0.95 | 1.78 | 2.54 | 3.36 | 2.87 | — | — | — | — | — | |
| 29 SF8 | 0.976 | 0.24 | 0.92 | 1.79 | 2.53 | 3.00 | 3.05 | | | | | | | |
| 30 SF5 | 0.966 | 0.52 | 1.27 | 1.87 | 2.13 | 1.89 | — | | | | | | | |
| 31 SF2 | 0.951 | 0.86 | 1.29 | 1.09 | | | — | — | — | — | — | — | — | |
| 32 SF7 | 0.947 | 0.91 | 1.16 | | | | — | — | — | — | — | — | — | |
| 33 F5 | 0.925 | 0.54 | 0.52 | | | | — | — | — | — | — | — | — | |
| 34 F8 | 0.921 | 0.55 | — | | | | | — | — | — | — | — | — | |

As it is evident from Table 1 and Table 2, it is preferable that the refractive index ratio r be within the range of $0.95 < n_{clad}^{2\omega} / n_{core}^{\omega} < 1.005$. Namely, if the glass material having the value of $n_{clad}^{2\omega}/n_{core}^{\omega}$ exceeding 1.005 is selected, the conversion efficiency of higher harmonics is decreased. If the value of $n_{clad}^{2\omega}/n_{core}^{\omega}$ is 0.95 or less, the range of the core radius is narrowed down where the guided primary light available as a wavelength conversion element is in a single mode, and the core radius is more strictly controlled in practical production. Or, the coupling efficiency of primary light to wavelength conversion element is decreased, and conversion efficiency is decreased as the result. Or, the coupling to wavelength conversion element of primary light becomes extremely sensitive to temperature change and external vibration, and the device lacks reliability.

As described above, the fiber type wavelength conversion element according to this invention comprises the material having the refractive index satisfying the condition of:

$$0.95 < n_{clad}^{2\omega}/n_{core}^{\omega} < 1.005$$

as clad material, and this provides high efficiency of the wavelength conversion.

What is claimed is:

1. A fiber type wavelength conversion element, comprising:
   a fiber core made of a non-linear optical crystal and having a circular cross section, and
   a clad material made of an optical glass and surrounding said core such that a wavelength of incident light is converted to a half wavelength of secondary higher harmonic light by non-linear optical effects of the second order in said core; and wherein
   said clad material has a refractive index which satisfies the following in equality $$0.968 \leq n_{clad}^{2\omega}/n_{core}^{\omega} < 1.005$$

where $n_{core}^{\omega}$ represents the refractive index of said fiber core with respect to incident light, and $n_{clad}^{2\omega}$ represents the refractive index of said clad material with respect to secondary higher harmonic light, the radius of said core being equal to or more than 0.50 μm and sufficient to guide said incident light for wavelength conversion such that conversion efficiency is maintained.

2. A fiber type wavelength conversion element according to claim 1, wherein said non-linear optical crystal is (3,5-dimethyl-1-(4-nitrophenyl) pyrazole).

3. A fiber type wavelength conversion element according to claim 2, wherein said clad material is optical glass having $n_{clad}^{2\omega}$ of 1.729.

4. A fiber type wavelength conversion element according to claim 2, wherein said clad material is optical glass having $n_{clad}^{2\omega}$ of 1.749.

5. A fiber type wavelength conversion element according to claim 2, wherein said clad material is optical glass having $n_{clad}^{2\omega}$ of 1.734.

6. A fiber type wavelength conversion element according to claim 1, wherein said non-linear optical crystals is DAN (4-(N,N-dimethylamino)-3-acetoamidenitrobenzene).

7. A fiber type wavelength conversion element according to claim 6, wherein said clad material is optical glass having $n_{clad}^{2\omega}$ of 1.7398.

8. A fiber type wavelength conversion element according to claim 6, wherein said clad material is optical glass having $n_{clad}^{2\omega}$ of 1.7254.

9. A fiber type wavelength conversion element according to claim 1, wherein said non-linear optical crystal is MNA (2-methyl-4-nitroaniline).

10. A fiber type wavelength conversion element according to claim 9, wherein said clad material is optical glass having $n_{clad}^{2\omega}$ of 1.7713.

* * * * *